US006971658B2

(12) United States Patent
Chao

(10) Patent No.: US 6,971,658 B2
(45) Date of Patent: Dec. 6, 2005

(54) STRETCHING BICYCLE

(76) Inventor: Hung-Chang Chao, 6F, No. 21, Alley 29, Lane 372, Section 5, Chung-Shiao East Road, Taipei (TW) 110

( * ) Notice: Subject to any disclaimer, the term of this patent is extended or adjusted under 35 U.S.C. 154(b) by 0 days.

(21) Appl. No.: 10/853,210

(22) Filed: May 26, 2004

(65) Prior Publication Data

US 2004/0239070 A1 Dec. 2, 2004

(30) Foreign Application Priority Data

May 30, 2003 (CN) ................................ 092210060

(51) Int. Cl.$^{7}$ ................................ B62K 15/00
(52) U.S. Cl. ................................ 280/278; 280/281.1
(58) Field of Search ................................ 280/287, 278, 280/302, 281.1, 293, 295, 261

(56) References Cited

U.S. PATENT DOCUMENTS 478,391 A * 7/1892 Bolte ...................... 280/281.1
640,680 A * 1/1900 Merrow ...................... 280/260
1,394,866 A * 10/1921 Schoenknecht ............. 280/287
2,993,709 A * 7/1961 Wick .......................... 280/287
3,513,926 A * 5/1970 Paget, Jr. .................... 180/208
4,973,074 A * 11/1990 Robinson .................... 280/658
5,607,171 A * 3/1997 Labranche ............... 280/288.1
5,887,882 A * 3/1999 Atchison ................. 280/288.1
6,273,442 B1 * 8/2001 Fallon et al. ............... 280/287
6,364,335 B1 * 4/2002 Mombelli ................... 280/287
2003/0151225 A1 * 8/2003 Lopez ........................ 280/282

* cited by examiner

*Primary Examiner*—Tony Winner
(74) *Attorney, Agent, or Firm*—Bacon & Thomas PLLC

(57) ABSTRACT

A stretching bicycle comprises a front frame section having a hollow front bar as a portion of crossbar, a rear frame section having a hollow rear bar for slidably receiving the front bar, the front and rear bars being disposed in a straight line not aligned with the front and rear wheels, and fastening means for securing the front and rear bars together at a front opening and a rear opening of the rear bar respectively. The bicycle has the advantages of adjusting length for accommodating users of different body heights in use, saving storage space after disassembly, and being structurally strong and lightweight.

9 Claims, 11 Drawing Sheets

10
11
12
13
14
15
16
17
20
21
22
23
24
25
27
28
29
30
31
32
33
34
35
38
39
52
53
55
60
61

STRETCHING BICYCLE

BACKGROUND OF THE INVENTION

1. Field of the Invention

The present invention relates to bicycles and more particularly to a stretching bicycle with a length adjustment mechanism so as to have the advantages of accommodating users of different body heights in use, saving storage space after disassembly, and being structurally strong and lightweight.

2. Description of the Prior Art

Stretching bicycles have the advantages of permitting users to adjust the length of the bicycle for accommodating his/her body height and saving storage space after disassembly. Thus, stretching bicycles as a continuous development of foldable bicycles are gaining popularity.

Referring to FIG. 10, a well-known stretching bicycle ("Document I") is shown. It discloses a separable crossbar consisting of a front bar 90 and a rear bar 91 releasably secured to the front bar 90 by a bolt 94. Document I has the following drawbacks. Only a small length reduction of the crossbar (i.e., the front bar 90) is achievable because the rear bar 91 is fixedly coupled to the seat tube 92 (i.e., seat tube 92 being a stop). Moreover, the fastening of the crossbar by the bolt 94 is weak, resulting in a potential of the crossbar being broken apart while driving. This is dangerous.

Referring to FIGS. 11 and 12, U.S. patent application Ser. No. 10/346,128, filed by the inventor of the present invention on Jan. 17, 2003 now U.S. Pat No. 6,712,375 B2 is shown. It discloses a stretching bicycle capable of eliminating the above drawbacks. As shown, two parallel main seat tube 71 and auxiliary seat tube 74 are extended upwardly from the bottom bracket 70 in a slightly inclined direction. Also, the main seat tube 71 is laterally displaced a predetermined distance from a lengthwise direction of the bicycle (i.e., not aligned with the crossbar). A seat stay is extended rearward from both the main seat tube 71 and the auxiliary seat tube 74 to the rear wheel 73. A seat post 75 is slidably inserted into the main seat tube 71. A laterally extended bar 76 is interconnected the seat post 75 and a saddle 77 so that the saddle 77 is adapted to align with the lengthwise direction of the bicycle again (i.e., aligned with the crossbar). The lower portion of the auxiliary seat tube 74 is coupled to a reinforcement tube 86 and a top thereof is coupled to a crossbar 78 having both ends open. Two T-shaped gaps 79 are formed adjacent a front end and a rear end of the crossbar 78 respectively so as to provide flexibility thereto. A sliding tube 81 has a front end fixedly coupled to head tube 80 and a rear end adapted to insert through the crossbar 78. Also, a lengthwise first groove 84 and a lengthwise mated second groove 85 are formed on the crossbar 78 and the sliding tube 81 respectively for facilitating a correct coupling of the crossbar 78 and the sliding tube 81 and preventing both from turning each other. Two quick releases 82 and 83 are adapted to clamp around the gaps 79 for securing the sliding tube 81 to the crossbar 78. Document II has advantages of being structurally strong and a maximum length reduction of the bicycle is achievable. However, Document II still has the disadvantage of having a relatively heavy frame due to the provision of the main seat tube 71, the auxiliary seat tube 74, and the laterally extended bar 76. Moreover, as stated above, the saddle 77 and the seat post 75 are not aligned in the vertical direction. Hence, the weight of the driver may not totally transmit to other components of the frame via the saddle 77, the laterally extended bar 76, and seat post 75. In other words, the joining portion of the laterally extended bar 76 and the seat post 75 bears a great portion of the weight of the driver. This in turn has the potential of breaking the joining portion while driving. This is dangerous. In brief, the bicycle can only support a driver having a small body weight. Thus, the need for improvement of the stretching bicycle still exists.

SUMMARY OF THE INVENTION

It is an object of the present invention to provide a stretching bicycle having the advantages of 1) being capable of decreasing the length of the bicycle to a minimum for greatly reducing storage space, increasing portability, and being adapted to mount in the trunk of a car for carrying; 2) being capable of preventing the crossbar and the sliding tube from turning each other so as to ride the bicycle as a typical fixed frame bicycle and eliminate the problem of hardly controlling the balance in riding as experienced in the prior stretching bicycle; 3) eliminating the provision of a seat tube composed of a plurality of components so as to be lightweight, easy in carrying, and simple in manufacture, and eliminate the need of aligning the center line of a saddle again; and 4) without providing an offset arrangement in the seat tube such that the seat tube, the seat post, and the saddle are adapted to align and dispose on the same vertical plane as the front and rear wheels, the structural strength of the bicycle is further enhanced, and the load borne on the saddle is without any adverse affection.

To achieve the above and other objects, the present invention provides a stretching bicycle in which both the sliding front bar and the rear bar for receiving the front bar are disposed in a straight line not aligned with a straight line from the front wheel to the rear wheel while that the seat tube, the seat post, and the saddle are disposed on the same vertical plane as the front and rear wheel such that a sliding movement of the front bar through both openings of the rear bar is not interfered by the seat tube in the center of the bicycle for achieving a maximum length reduction of the bicycle.

In one embodiment of the present invention, the rear bar and the seat tube are fixedly coupled together by a reinforcement member having a flat base portion secured to the side surface of the seat tube and two extended portions secured to the rear bar. The lower portion of the auxiliary seat tube is coupled to a reinforcement tube which has one end secured to a bottom bracket by soldering. The reinforcement tube is oblique with respect to the vertical plane formed by the front and rear wheels. The rear bar is thus disposed in a straight line not aligned with the straight line from the front wheel to the rear wheel. The front bar is extended rearward from the head tube in an oblique angle the same as that of the rear bar such that the front bar is free to slide through the front and rear openings of the rear bar having the same oblique angle with being interfered by the seat tube in the center of the bicycle.

BRIEF DESCRIPTION OF THE DRAWINGS

The drawings disclose an illustrative embodiment of the present invention which serves to exemplify the various advantages and objects hereof, and are as follow.

DETAILED DESCRIPTION OF THE PREFERRED EMBODIMENTS

Figure 1:
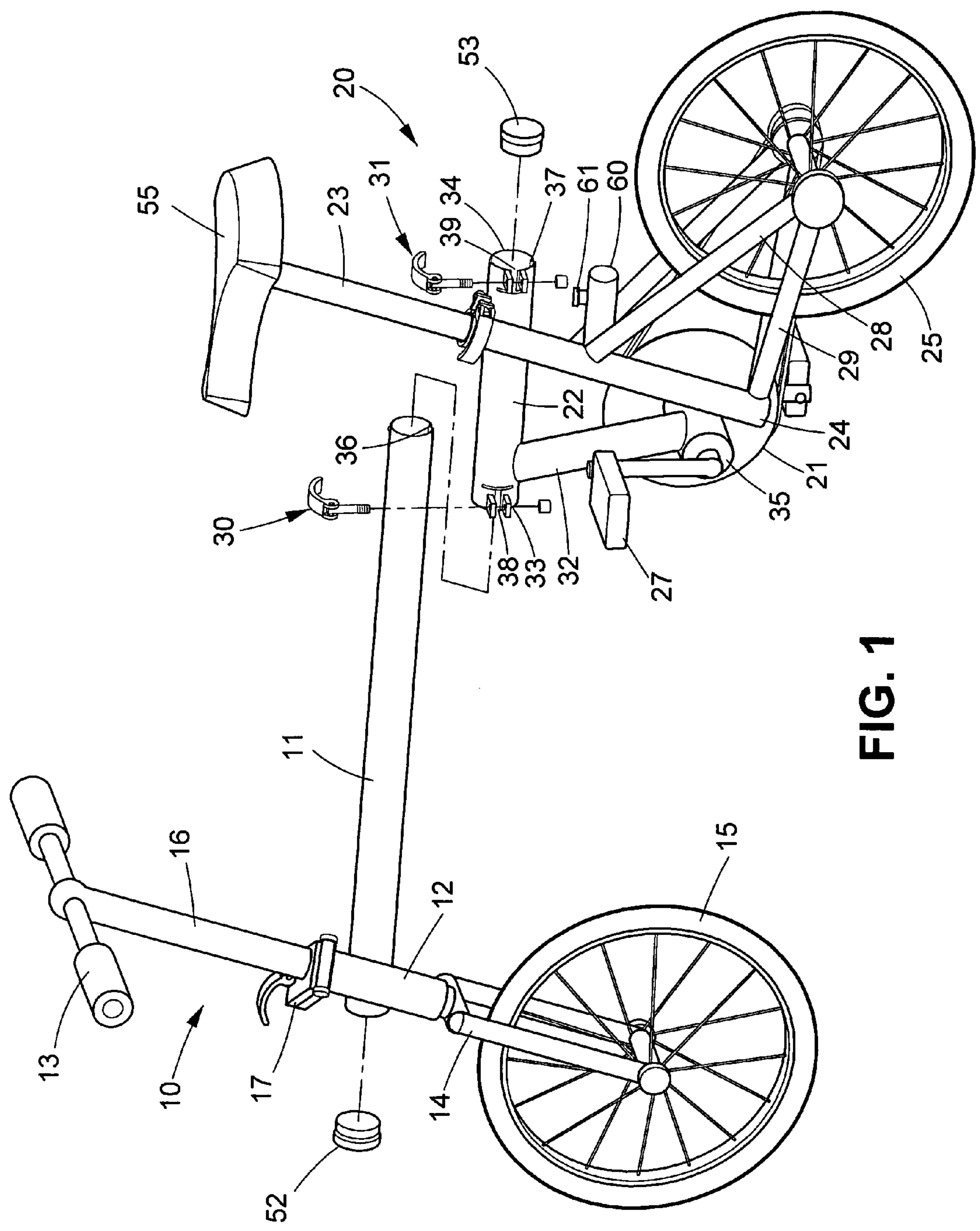
FIG. 1 is an exploded perspective view of a first preferred embodiment of stretching bicycle according to the invention.
Figure 2:
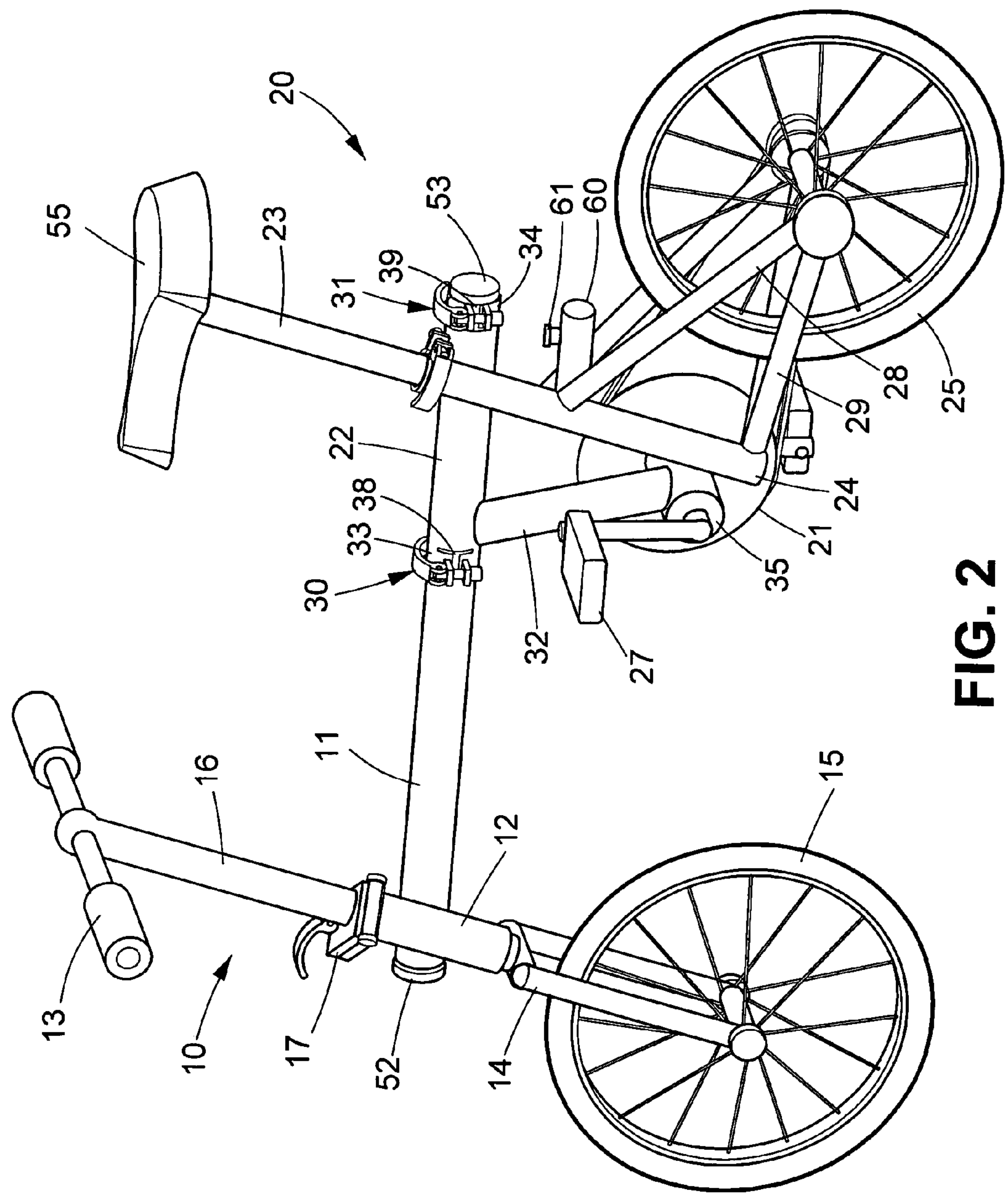
FIG. 2 is a perspective view of the assembled bicycle of FIG. 1.
Figure 3:
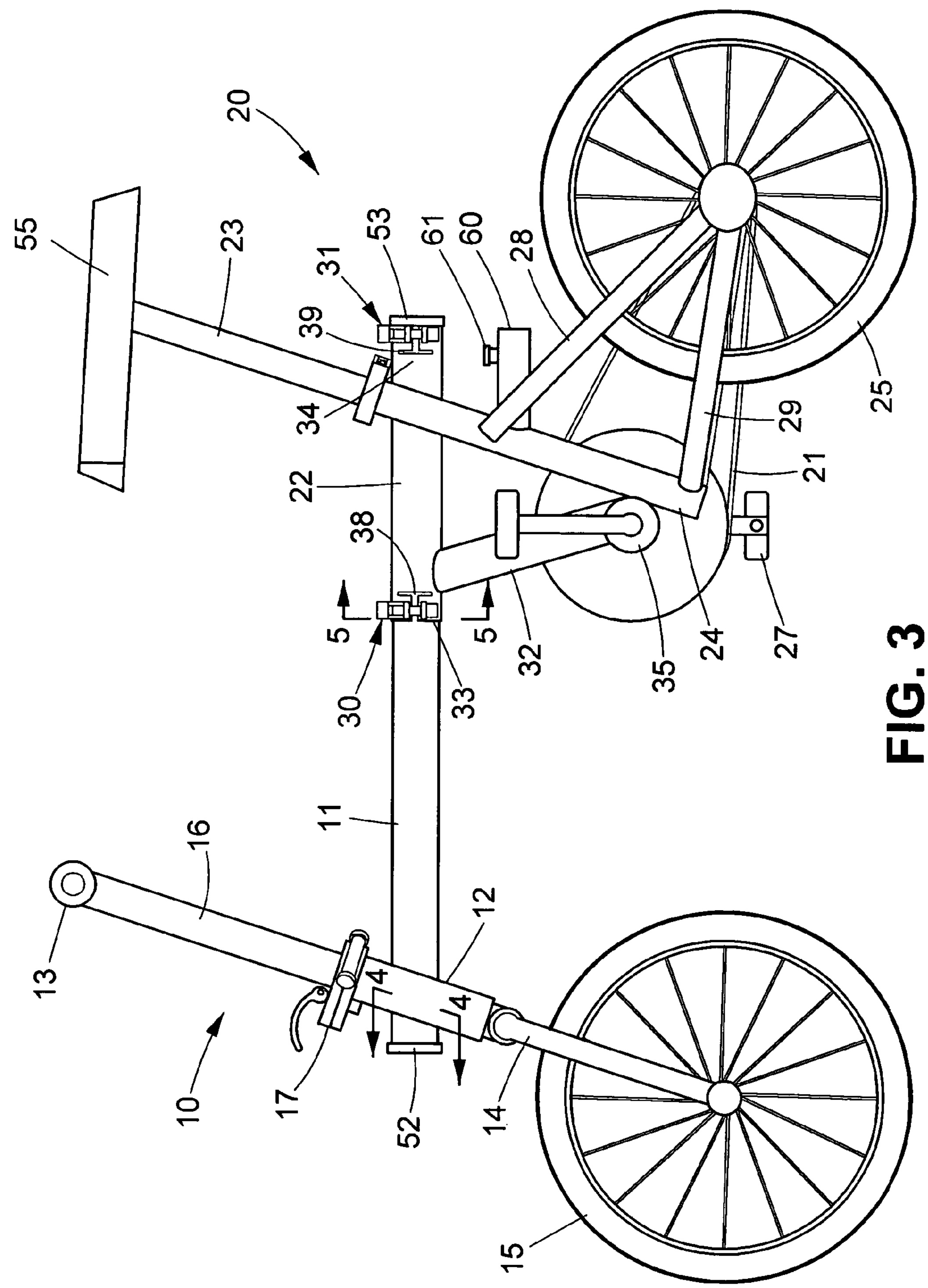
FIG. 3 is a side plan view of the bicycle shown in FIG. 2.
Figure 4:
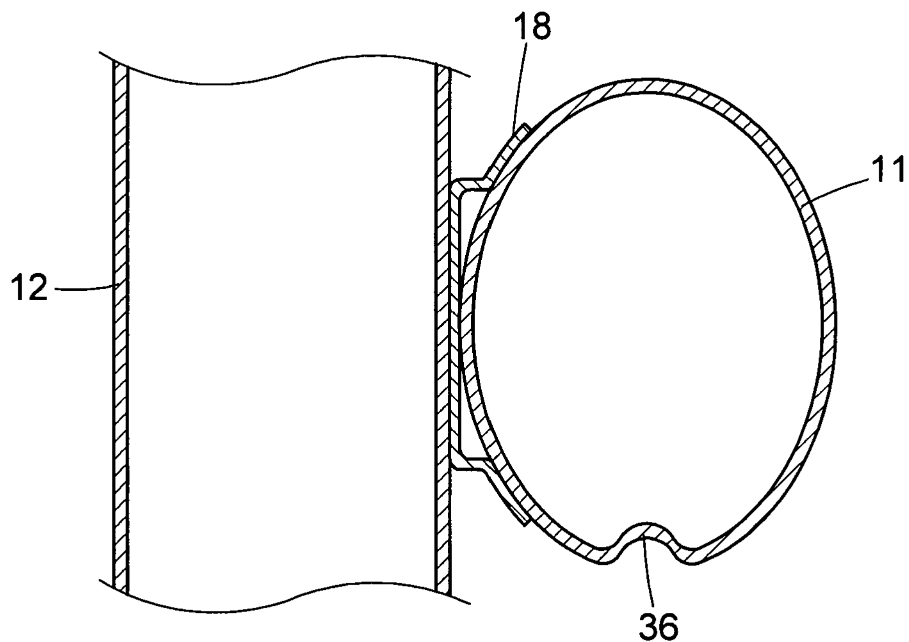
FIGS. 4 and 5 are cross-sectional views taken along line 4—4 and line 5—5 of FIG. 3 respectively.

Referring to FIGS. 1 to 8, there is shown a stretching bicycle constructed in accordance with a first preferred embodiment of the invention. The bicycle comprises a front frame section 10 and a rear frame section 20. A fastening and length adjustment mechanism is provided to secure the frame sections 10 and 20 together as detailed later. The front frame section comprises a head tube 12, a fork 14, handlebars 13, a handle tube 16 interconnected the handlebars 13 and the head tube 12, a front wheel 15 releasably coupled to the fork 14 by mean of a well known quick release, two bearings (not shown) provided between the fork 14 and the head tube 12 so that the handlebars 13 are adapted to turn a predetermined angle, and a hinge 17 provided at the joining portion of the head tube 12 and the handle tube 16 so that the handle tube 16 is adapted to fold downwardly from the hinge 17.

The rear frame section 20 comprises a bottom bracket 35, a pair of pedals 27 coupled to the bottom bracket 35, a sprocket wheel 21 coupled to the bottom bracket 35, a rear wheel 25, a chain stay 29 extended rearward from the bottom bracket 35 to an axle of the rear wheel 25, a seat tube 24 extended upwardly from the bottom bracket 35, a seat stay 28 having a rear end coupled to the axle of the rear wheel 25, a seat post 23 slidably inserted into the seat tube 24, the seat post 23 having a top saddle 55, and a quick release (not numbered) at a top opening of the seat tube 24, the quick release being adapted to secure the seat post 23 and the seat tube 24 together.

A crossbar comprises a hollow front bar 11 having a front end fixedly coupled to an outer surface of the head tube 12 (i.e., the front bar 11 is not aligned with the head tube 12) by a first reinforcement member 18 having a section of substantially U in which the flat base portion of the first reinforcement member 18 is secured to the outer surface of the head tube 12 and two extended portions thereof are secured to the front bar 11 so that the coupling strength between the front bar 11 and the head tube 12 can be increased significantly. A first cap 52 is adapted to matingly couple to a front opening of the front bar 11 so that articles such as umbrella, air pump, etc. stored in the front bar 11 can be prevented from leaving accidentally. Moreover, in a case of the bicycle implemented as an electric bicycle and powered by rechargeable battery assembly, the battery assembly can be stored in the front bar 11.

Figure 5:
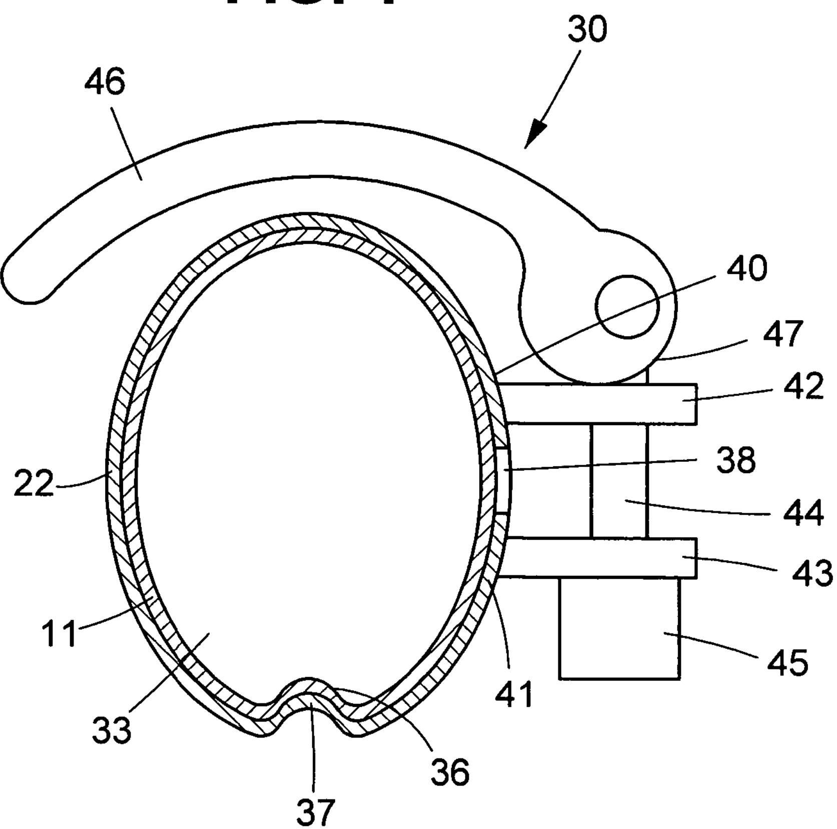

The crossbar further comprises a hollow rear bar 22 having a portion proximate a rear opening 34 fixedly coupled to a side surface of the seat tube 24 by soldering (i.e., the rear bar 22 is not aligned with the seat tube 24). A second cap 53 is adapted to matingly couple to the rear opening of the front bar 11 for enclosing. The front bar 11 is adapted to slide through a front opening 33 and the rear opening 34 of the rear bar 22 because an outer diameter of the front bar 11 is substantially conformed to an inner diameter of the rear bar 22. As shown in FIG. 5, a lengthwise first groove 37 and a lengthwise mated second groove 36 are formed on the rear bar 22 and the front bar 11 respectively for facilitating a correct coupling of the rear bar 22 and the front bar 11 and preventing both from turning each other. Two T-shaped gaps 38 and 39 are formed adjacent the front opening 33 and the rear opening 34 respectively so as to provide flexibility thereto.

The rear bar 22 and the inserted front bar 11 are secured together by fastening first and second quick releases 30 and 31 at the front T-shaped gap 38 and the rear T-shaped gap 39 by flexibly deforming the T-shaped gaps 38 and 39 respectively. In detail, as seen in FIG. 5, an upper flexible member 40 and a lower flexible member 41 are formed by the provision of the T-shaped gap 38. An upper lug 42 and a lower lug 43 are extended laterally from the upper and lower flexible members 40 and 41 respectively. A bolt 44 of the first quick release 30 is inserted through the holes of the lugs 42 and 43 to be threadedly coupled to a nut 45. A user may counterclockwise turn the arcuate lever 46 of the first quick release 30 to cause the cam 47 to exert force to pull the lugs 42 and 43 toward each other by flexibly deforming the upper and lower flexible members 40 and 41. As such, the rear bar 22 exerts force to clamp around the front bar 11 for fastening the front bar 11. To the contrary, a reverse operation of the lever 46 can unfasten the front bar 11 and the rear bar 22. This is obvious to those skilled in the art. The second quick release 31 will not be described in detail below since it is a mirror image of the first quick release 30.

Note that the quick release as shown in the embodiment of FIG. 1 can be replaced by a commercially available ring fastener or the like in any other embodiments. In the embodiment the section of the front bar 11 or the rear bar 22 is oval as shown in FIG. 5, while it is appreciated by those skilled in the art that the cross-section of the front bar 11 or the rear bar 22 may be any of other shapes such as circle or rectangle without departing from the scope and spirit of the invention.

Figure 6:
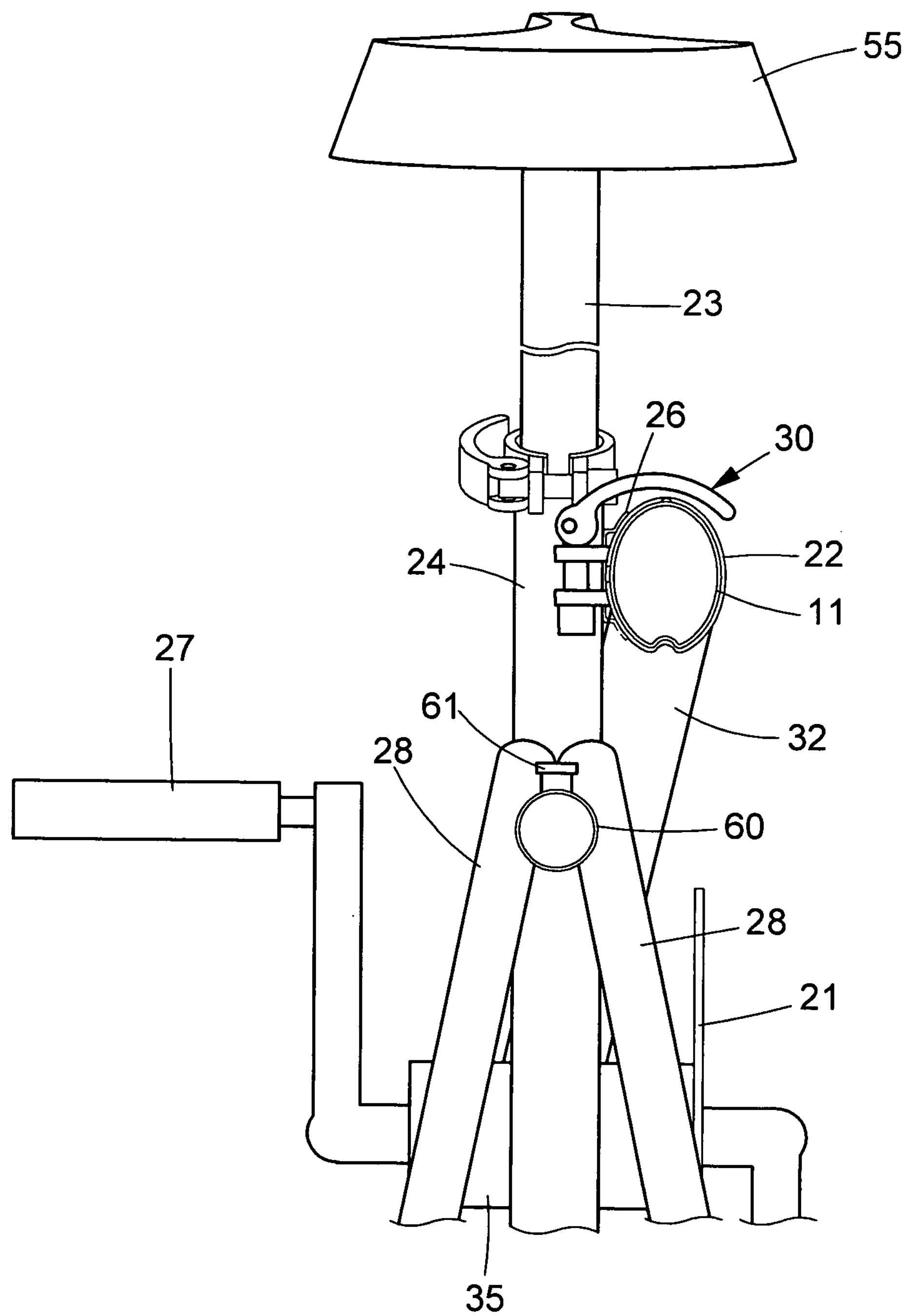
FIG. 6 is a partial rear view in part section of the bicycle of FIG. 3.
Figure 7:
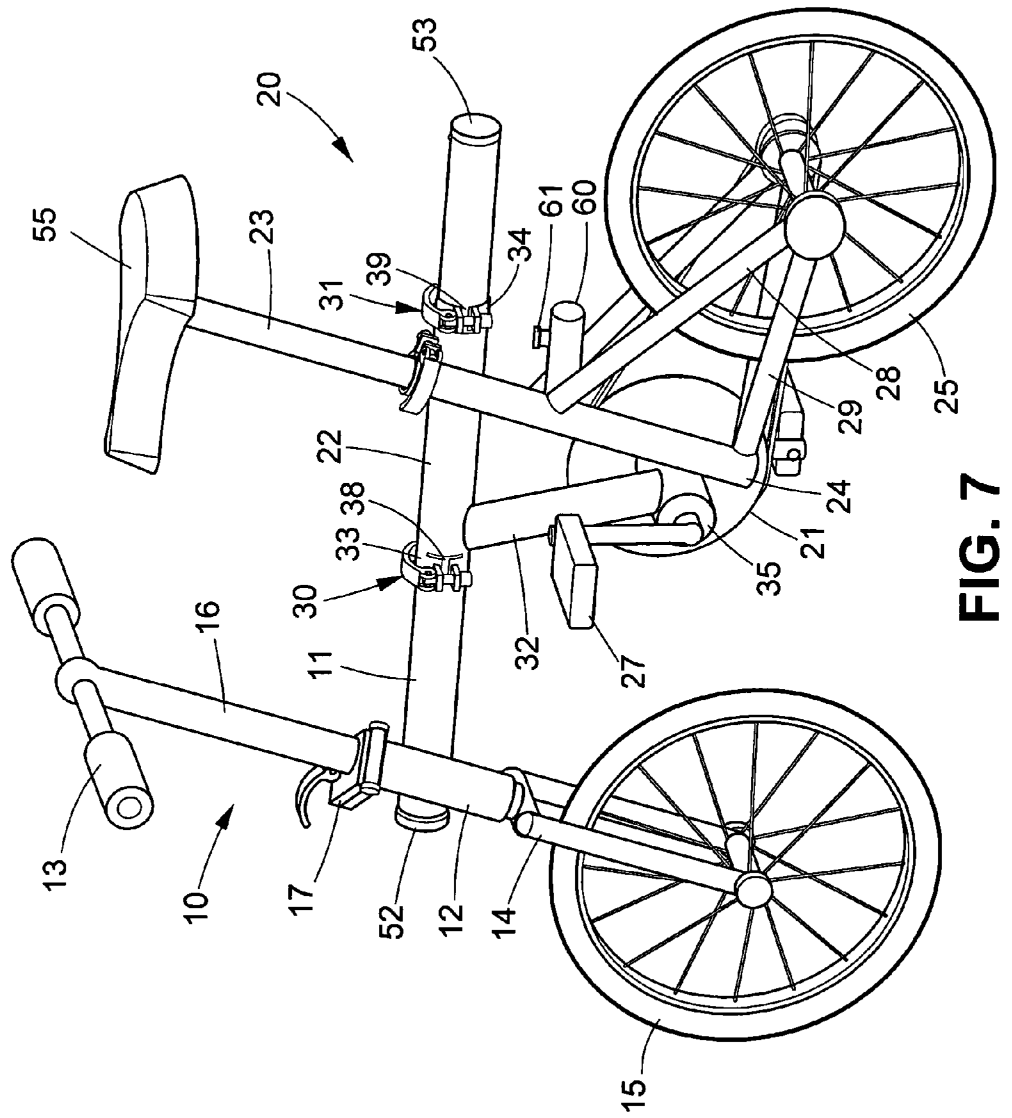
FIG. 7 is a view similar to FIG. 2, where the length of the bicycle has been adjusted to a position ready to ride.
Figure 8:
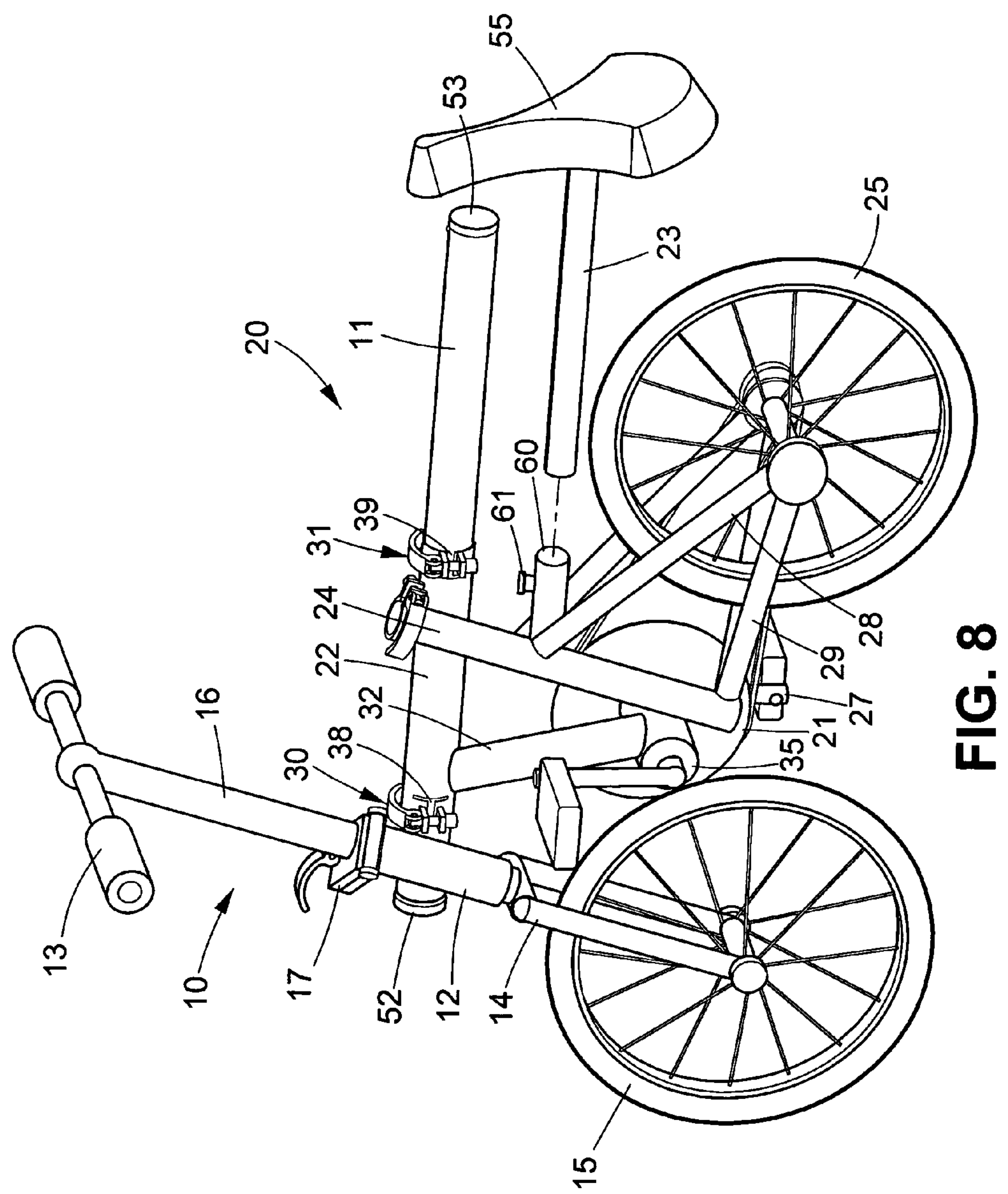
FIG. 8 is a view similar to FIG. 7, where the length of the bicycle has been adjusted to a minimum and the saddle and the seat post are removed to be inserted into the horizontal tube for storage.

As shown in FIG. 6, the rear bar 22 and the seat tube 24 are fixedly coupled together by a second reinforcement member 26 having a section of substantially U in which the flat base portion of the second reinforcement member 26 is secured to the side surface of the seat tube 24 and two extended portions thereof are secured to the rear bar 22 so that the coupling strength between the rear bar 22 and the seat tube 24 can be increased significantly. Moreover, an oblique down tube 32 as a reinforcement is interconnected the rear bar 22 and the bottom bracket 35. The rear bar 22, the seat tube 24, and the down tube 32 form a triangle. Likewise, the seat stay 28, the chain stay 29, and the seat tube 24 form another triangle. As a result, the frame strength of the bicycle is increased greatly.

It is noted that both the front bar 11 and the rear bar 22 are disposed in a first straight line. The seat tube 24, the seat post 23, the saddle 55, and the front and rear wheels 15 and 25 are disposed in a second straight line. But the first and second straight lines are not aligned. That is, both the front bar 11 and the rear bar 22 are displaced laterally a predetermined distance with respect to the second straight line. For adjusting the length of the bicycle (i.e., the crossbar), a user may unfasten the first and second quick releases 30 and 31. Next, slide the front bar 11 through the front opening 33 and the rear opening 34 of the rear bar 22 without being stopped by the seat tube 24 until a desired length is obtained. Finally, fasten the first and second quick releases 30 and 31 again. In a maximum length of the crossbar (see FIG. 2) the bicycle is adapted to be ridden by an adult. In a medium length of the crossbar (see FIG. 7) the bicycle is adapted to be ridden by a short person (e.g., child). In a minimum length of the crossbar (see FIG. 8) both the seat post 23 and the saddle 55 are detached and are ready to insert into a horizontal tube 60 extended rearward from the seat tube 24. A bolt 61 is adapted to drive into the horizontal tube 60 for fastening the seat post 23 in the horizontal tube 60. Next, fold the handle tube 16 downwardly at the hinge 17. The bicycle having the reduced size is thus adapted to store, for example, in the trunk of a car prior to going for an outing.

Figure 9:
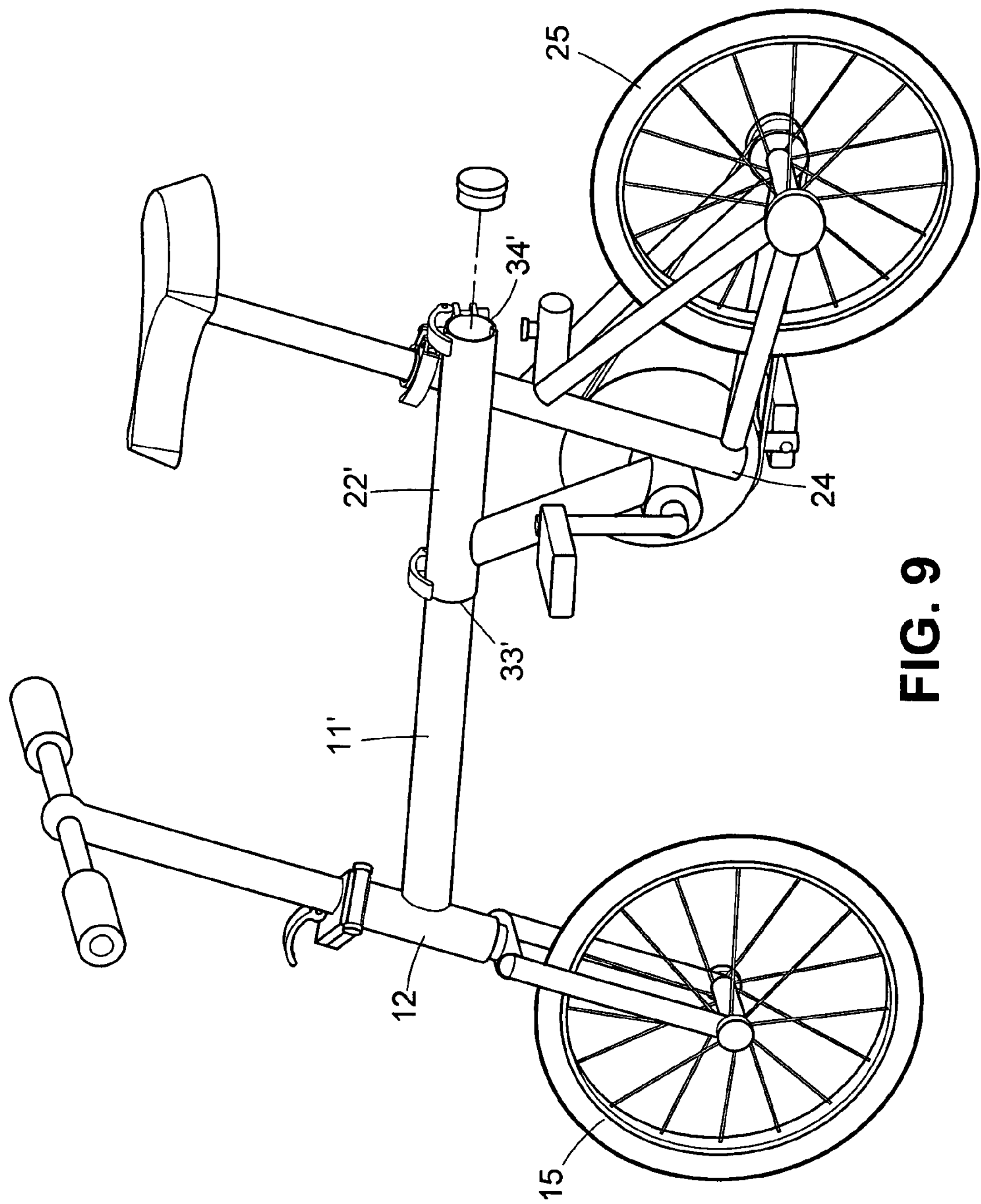
FIG. 9 is a perspective view of a second preferred embodiment of stretching bicycle according to the invention.
Figure 10:
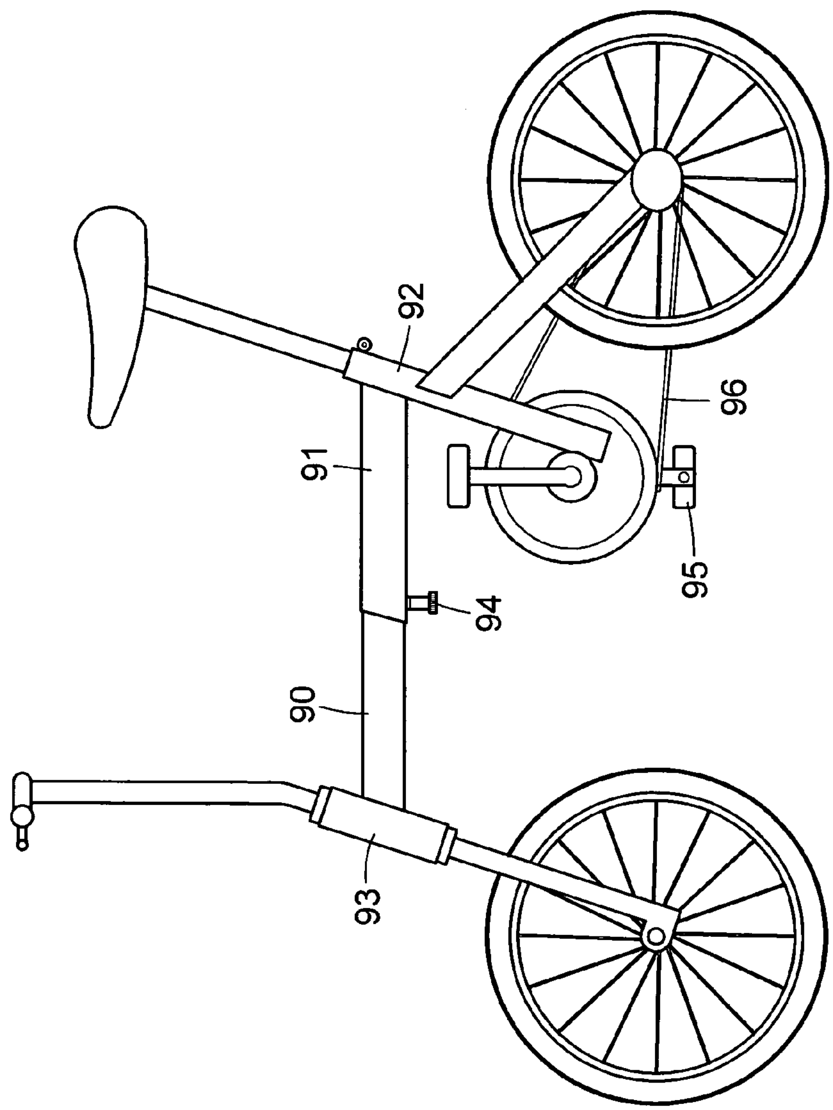
FIG. 10 is a side plan view of a conventional stretching bicycle.
Figure 11:
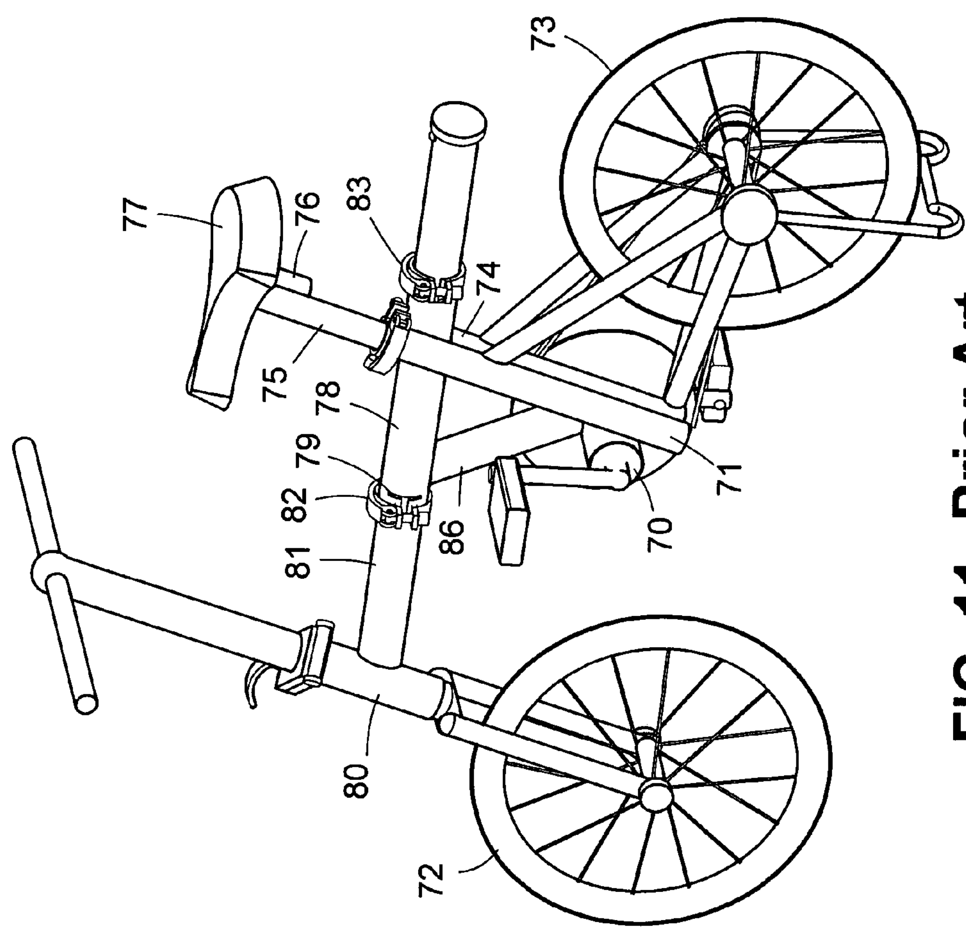
FIG. 11 is a perspective view of another conventional stretching bicycle.
Figure 12:
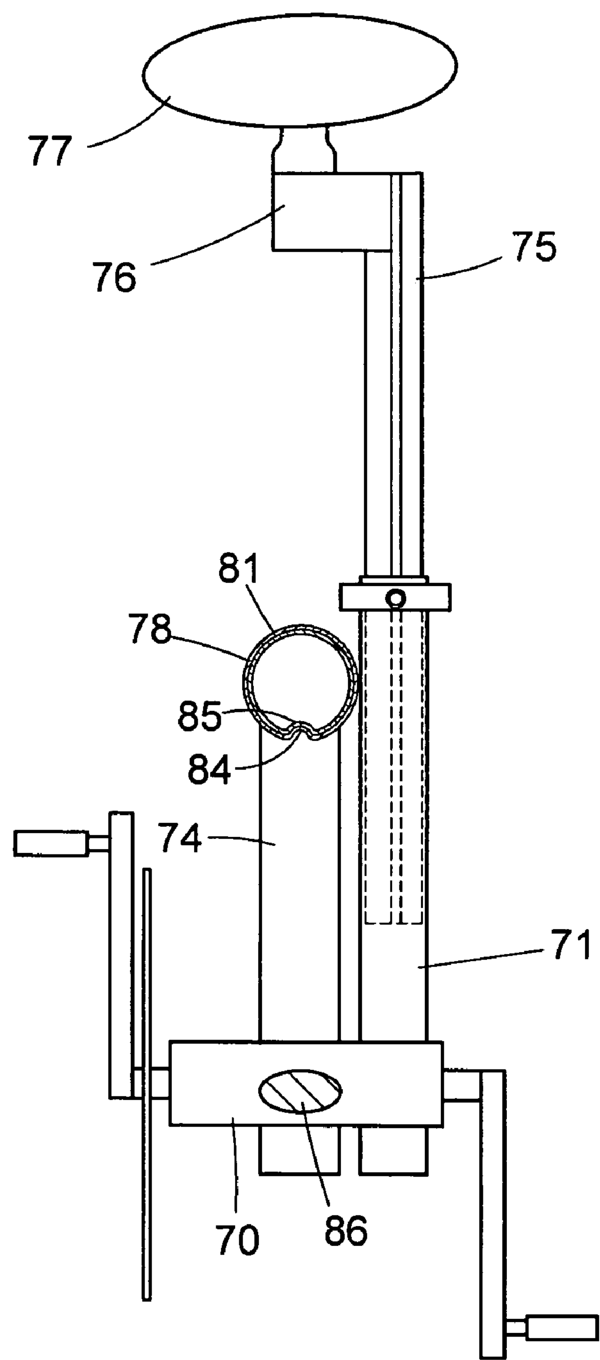
FIG. 12 is a schematic front view in part section of the bicycle of FIG. 11.

Referring to FIG. 9, there is shown a stretching bicycle constructed in accordance with a second preferred embodiment of the invention. The second preferred embodiment substantially has same structure as the first preferred embodiment. The differences between the first and the second preferred embodiments, i.e., the characteristics of the second preferred embodiment are detailed below. The front end of the front bar 11' is enclosed by the head tube 12 and the front bar 11' is extended obliquely (i.e., not aligned with the front and rear wheels 15 and 25). Also, the rear bar 22' is aligned with the front bar 11' (i.e., the rear bar 22' is still extended in the same oblique angle). Thus, it is possible of sliding the front bar 11' through the front opening 33' and the rear opening 34' of the rear bar 22 without being stopped by the seat tube 24 in the length adjustment operation.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A stretching bicycle, comprising:

a front frame section including a head tube, a fork, handlebars, a handle tube interconnected the handlebars and the head tube, a front wheel;

a rear frame section including a bottom bracket, a pair of pedals coupled to the bottom bracket, a sprocket wheel coupled to the bottom bracket, a rear wheel, a chain stay extended rearward from the bottom bracket to an axle of the rear wheel, a seat tube extended upwardly from the bottom bracket, a seat stay having a rear end coupled to the axle of the rear wheel, a seat post slidably inserted into the seat tube, a saddle formed on a top of the seat post;

a front bar having a front end coupled to the head tube and a rear end, the front bar is extended rearward in a predetermined oblique angle with respect to a straight line between the front wheel and the rear wheel;

a hollow rear bar for slidably receiving the front bar, the rear bar being axially aligned with the front bar and coupled to a side surface of the seat tube; and a fastening mechanism including first and second fastening means for securing the front bar to the rear bar at a front opening and a rear opening of the rear bar respectively.

2. The stretching bicycle of claim 1, wherein the rear bar comprises a lengthwise first groove and the front bar comprises a lengthwise second groove matingly coupled to the first groove for preventing the rear and the front bars from turning each other.

3. The stretching bicycle of claim 1, further comprising an oblique, reinforced down tube interconnected the rear bar and the bottom bracket.

4. The stretching bicycle of claim 1, further comprising a second reinforcement member for fixedly coupling the rear bar and the seat tube together.

5. The stretching bicycle of claim 1, wherein the rear bar further comprises a first T-shaped gap and a second T-shaped gap at the front opening and the rear opening of the rear bar respectively so as to provide flexibility thereto when the front bar and the rear bar are fastened by the first and second fastening means.

6. The stretching bicycle of claim 5, wherein each of the first and second T-shaped gaps comprises an upper flexible member, a lower flexible member, upper and lower lugs extended laterally from the upper and lower flexible members respectively, a bolt of the first fastening means adapted to insert through the upper and lower lugs to be threadedly coupled to a nut, and an arcuate lever having a cam end pivotably coupled to the head of the bolt so that either a counterclockwise turning of the arcuate lever causes the cam to exert force to pull the upper and lower lugs toward each other by flexibly deforming the upper and lower flexible members, or a clockwise turning of the arcuate lever causes the cam to release the force to pull the upper and lower lugs away from each other.

7. The stretching bicycle of claim 1, wherein the front end of the front bar is fixedly coupled to an outer surface of the head tube.

8. The stretching bicycle of claim 7, further comprising a first reinforcement member for fixedly coupling the front bar and the outer surface of the head tube together.

9. The stretching bicycle of claim 7, wherein the front bar is hollow and the front bar further comprises two caps releasably coupled to the front and the rear ends thereof respectively.

* * * * *